(12) United States Patent
Jung

(10) Patent No.: US 11,891,031 B2
(45) Date of Patent: Feb. 6, 2024

(54) BRAKE CONTROL APPARATUS AND METHOD OF CONTROLLING BRAKE APPARATUS

(71) Applicant: HL MANDO CORPORATION, Gyeonggi-do (KR)

(72) Inventor: Jaewon Jung, Gyeonggi-do (KR)

(73) Assignee: HL MANDO CORPORATION, Gyeonggi-Do (KR)

( * ) Notice: Subject to any disclaimer, the term of this patent is extended or adjusted under 35 U.S.C. 154(b) by 264 days.

(21) Appl. No.: 17/401,237

(22) Filed: Aug. 12, 2021

(65) Prior Publication Data
US 2022/0048489 A1 Feb. 17, 2022

(30) Foreign Application Priority Data
Aug. 14, 2020 (KR) .................. 10-2020-0102378

(51) Int. Cl.
*B60T 13/68* (2006.01)
*B60T 8/58* (2006.01)
(Continued)

(52) U.S. Cl.
CPC ............ *B60T 13/686* (2013.01); *B60T 8/326* (2013.01); *B60T 8/58* (2013.01); *B60T 15/028* (2013.01);
(Continued)

(58) Field of Classification Search
CPC .......... B60T 8/32; B60T 8/3205; B60T 8/326; B60T 8/344; B60T 8/4018; B60T 8/404; B60T 8/4054; B60T 8/4059; B60T 8/1764; B60T 8/58; B60T 8/86; B60T 13/686; B60T 15/028; B60T 2220/24; B60T 2240/00; B60T 2250/04; B60T 2250/042; B60T 2270/20; B60T 2270/211; B60T 2270/213; B60W 30/18027; B60W 30/18109
See application file for complete search history.

(56) References Cited

U.S. PATENT DOCUMENTS 5,826,954 A * 10/1998 Schmitt ................. B60T 8/4872
303/113.5
6,533,367 B1 * 3/2003 Latarnik ................. B60T 8/175
303/113.2

(Continued)

FOREIGN PATENT DOCUMENTS

JP 8-108842 4/1996
JP 3939936 7/2007

*Primary Examiner* — Thomas J Williams
(74) *Attorney, Agent, or Firm* — Ladas & Parry, LLP (57) ABSTRACT

Provided is a brake control apparatus mounted in a vehicle with a plurality of wheels, the brake control apparatus including: a actuator configured to apply a braking torque to the plurality of wheels; and a controller configured to control the actuator to apply a first braking torque to a first wheel of the plurality of wheels, based on a spin of the first wheel being greater than or equal to a target spin, and to control the actuator to apply a second braking torque to the plurality of wheels based on a displacement of a brake pedal of the vehicle while applying the first braking torque to the first wheel, wherein the controller stepwise or linearly increases a braking torque applied to a second wheel of the plurality of wheels up to the second braking torque.

10 Claims, 8 Drawing Sheets

(51) Int. Cl.
*B60T 8/32* (2006.01)
*B60T 15/02* (2006.01)

(52) U.S. Cl.
CPC ....... *B60T 2220/04* (2013.01); *B60T 2240/00* (2013.01)

(56) References Cited

U.S. PATENT DOCUMENTS

| | | | | |
|---|---|---|---|---|
| 6,652,039 | B1* | 11/2003 | Shull | B60T 8/404 303/113.5 |
| 10,421,447 | B2* | 9/2019 | Leiber | B60T 8/328 |
| 2022/0048489 | A1* | 2/2022 | Jung | B60T 13/686 |

* cited by examiner

BRAKE CONTROL APPARATUS AND METHOD OF CONTROLLING BRAKE APPARATUS

CROSS-REFERENCE TO RELATED APPLICATION

This application is based on and claims priority under 35 U.S.C. § 119 to Korean Patent Application No. 10-2020-0102378, filed on Aug. 14, 2020 in the Korean Intellectual Property Office, the disclosure of which is incorporated herein by reference.

BACKGROUND

1. Field

The disclosure relates to a brake control apparatus and a method of controlling a brake apparatus, and more specifically, to a brake control apparatus including a Traction Control System (TCS) and a method of controlling a brake apparatus.

2. Description of the Related Art

Vehicles are equipped with a brake system for performing braking, and various types of brake control apparatuses for controlling brake systems have been proposed for the safety of drivers and passengers.

Recently, a Traction Control System (TCS) for improving traction has been provided in vehicles. The TCS controls driving torque supplied to wheels to prevent wheel spin (or wheel slip).

A Brake Traction Control System (BTCS) is provided in a brake control apparatus for improving vehicle's traction performance. The BTCS may control a braking torque of wheels to prevent lateral asymmetrical spin of the wheels due to uneven friction coefficient (Split mu) of road surface conditions.

In a conventional brake control apparatus, however, when braking by the BTCS and braking by an intervention of a driver are simultaneously performed, a valve is closed to separate a wheel cylinder of a wheel controlled by the BTCS from other hydraulic circuits. Due to the valve closure, noise occurs.

SUMMARY

The present disclosure provides a brake control apparatus and a method of controlling a brake apparatus that may minimize noise and secure the spin stability of wheels, although braking by the BTCS and braking by a driver are simultaneously performed.

Additional aspects of the disclosure will be set forth in part in the description which follows and, in part, will be obvious from the description, or may be learned by practice of the disclosure.

According to an aspect of the disclosure, there is provided a brake control apparatus mounted in a vehicle with a plurality of wheels, the brake control apparatus including: an actuator configured to apply a braking torque to the plurality of wheels; and a controller configured to control the actuator to apply a first braking torque to a first wheel of the plurality of wheels, based on a spin of the first wheel being greater than or equal to a target spin, and to control the actuator to apply a second braking torque to the plurality of wheels based on a displacement of a brake pedal of the vehicle while applying the first braking torque to the first wheel, wherein the controller stepwise or linearly increases a braking torque applied to a second wheel of the plurality of wheels up to the second braking torque.

According to an aspect of the disclosure, there is provided a brake control apparatus mounted in a vehicle with a plurality of wheels, including: a piston pump configured to supply a hydraulic pressure to a plurality of wheel cylinders corresponding to each of the plurality of wheels; a drive motor configured to drive the piston pump; a flow path extended to the plurality of wheel cylinders from the piston pump; a plurality of valves located on the flow path; and a controller configured to control the drive motor and the plurality of valves based on a displacement of a brake pedal, wherein the controller is configured to: open a first valve, located on the flow path extended to a first wheel cylinder corresponding to a first wheel, and controls the drive motor to supply the first wheel cylinder with a first hydraulic pressure corresponding to a first braking torque, based on a spin of the first wheel of the plurality of wheels being greater than or equal to a target spin, and stepwise or linearly open a second valve, located on the flow path extended to a second wheel cylinder corresponding to a second wheel of the plurality of wheels, based on the displacement of the brake pedal.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

Reference will now be made in detail to the exemplary embodiments, examples of which are illustrated in the accompanying drawings, wherein like reference numerals refer to like elements throughout.

The expression, "at least one of a, b, and c," should be understood as including only a, only b, only c, both a and b, both a and c, both b and c, or all of a, b, and c.

Hereinafter, embodiments will be described in detail with reference to the accompanying drawings.

Figure 1:
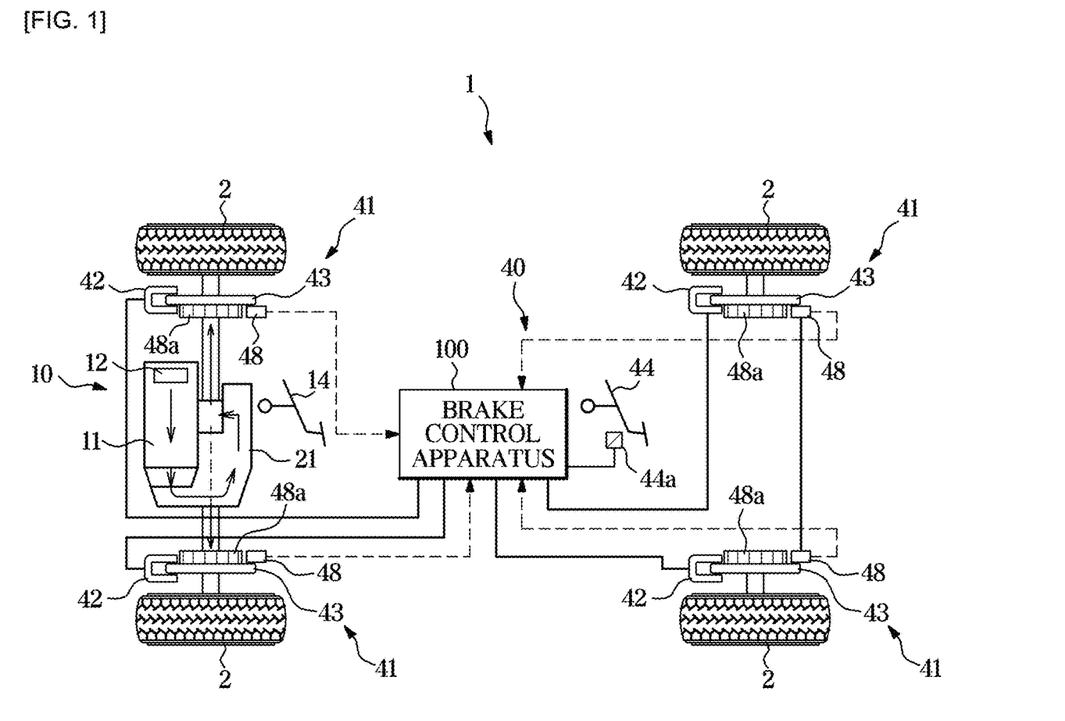
FIG. 1 is a diagram illustrating a drive system and a brake system included in a vehicle according to an embodiment.

FIG. 1 is a diagram illustrating a drive system and a brake system of a vehicle according to an embodiment.

A vehicle 1 includes a body that forms an exterior of the vehicle and accommodates a driver and/or luggage, a chassis including other elements of the vehicle 1 aside from the body, and wheels 2 that enable the vehicle 1 to move.

Referring to FIG. 1, the vehicle 1 includes a drive system 10 and a brake system 40.

The drive system 10 generates a driving torque for driving the vehicle 1. Also, the drive system 10 includes an engine 11, an engine control module 12, and a transmission 21.

The engine 11 includes a cylinder and a piston, and may generate a driving torque for driving the vehicle 1. The transmission 21 includes a plurality of gears and may transmit the driving torque generated by the engine 11 to the wheel 2. In particular, the transmission 21 includes a differential gear that enables a left wheel and a right wheel to be rotated at different rotational speeds by the driving torque of the engine 11.

The engine control module 12 may include an Electronic Control Unit (ECU) for controlling a driving torque and/or a Revolution Per Minute (RPM) of the engine 11, in response to an accelerator pedal 11a operated by driver's acceleration intention.

The brake system 40 generates a braking torque for stopping the vehicle 1 and includes a brake apparatus 41 and a brake control apparatus 100.

As shown in FIG. 1, the brake apparatus 41 may include a brake caliper 42 mounted close to each of the wheels 2. The brake caliper 42 includes a pair of brake pads provided on both sides of a brake disc 43 connected to each of the wheels 2. The brake caliper 42 may press the both sides of the brake disc 43 by fluid pressure or mechanical pressure. Rotation of the brake disc 43 and the wheel 2 may be stopped by friction between the brake pad and brake disc 43.

Figure 2:
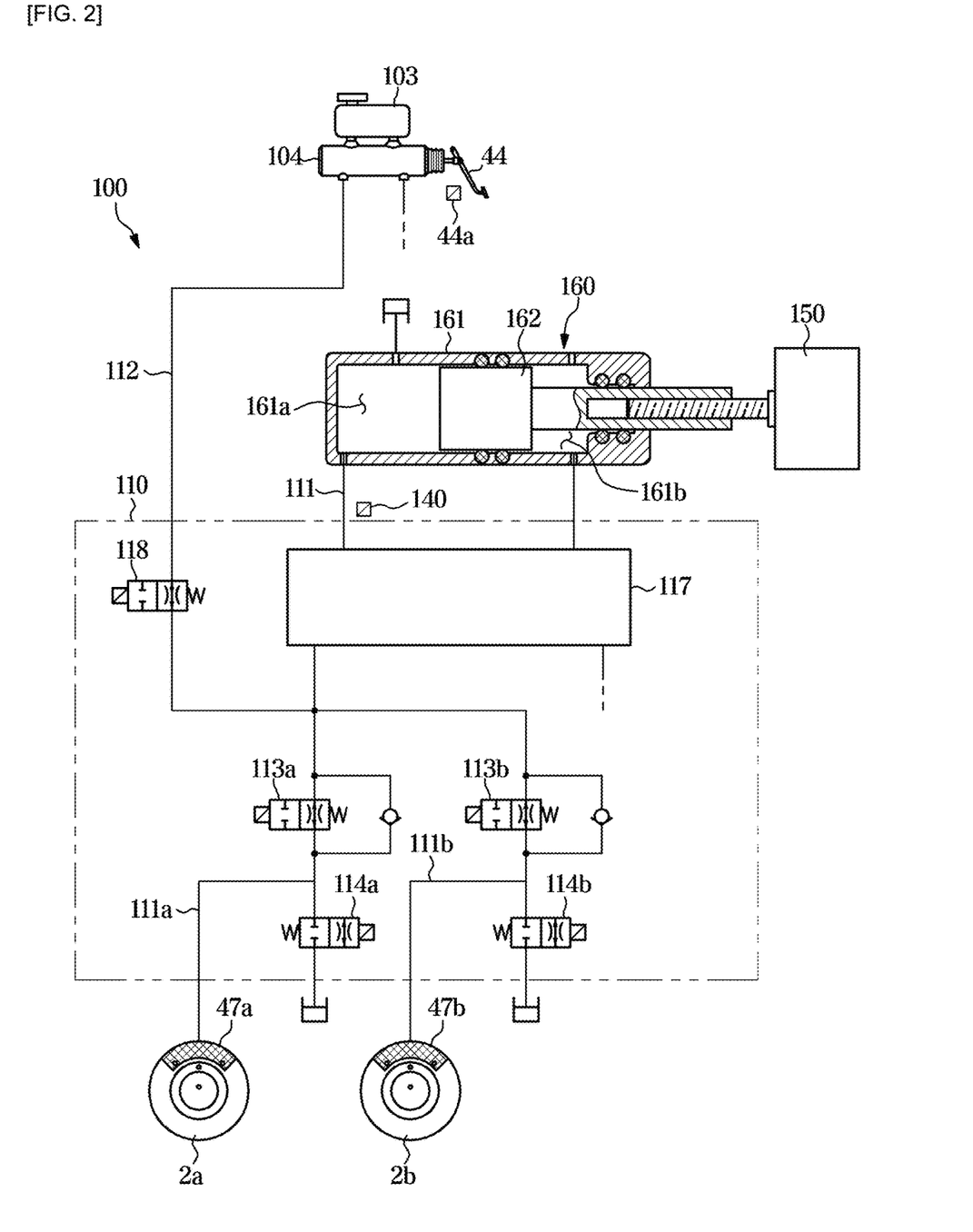
FIG. 2 is a hydraulic circuit diagram of a brake control apparatus according to an embodiment.

Also, the brake caliper 42 may include wheel cylinders 47a and 47b shown in FIG. 2. The wheel cylinders 47a and 47b receive pressurization medium, e.g. brake oil, from the brake control apparatus 100, and enable the brake pad to contact the brake disc 43 by pressure of the pressurization medium. Hereinafter, pressure of the pressurization medium is referred to as "hydraulic pressure".

A wheel speed sensor 48 is provided close to the wheel 2 for sensing a rotational speed of the wheel 2. The wheel speed sensor 48 may sense a rotational speed of the wheel 2 of the vehicle 1. The wheel speed sensor 48 is mounted close to each of a plurality of wheels, e.g. four wheels, and may sense a rotational speed of each of the plurality of wheels. For instance, the wheel 2 of the vehicle 1 may include a serrated ring 48a with a plurality of metal poles on exterior of the ring. Also, the wheel speed sensor 48 may include a rod-shaped permanent magnet and a coil wound around the permanent magnet. The wheel speed sensor 48 is located close to the serrated ring 48a so that the pole of the permanent magnet (north pole or south pole) faces the serrated ring 48a. Rotation of the serrated ring 48a by rotation of the wheel 2 causes a change in magnetic field around the permanent magnet. Also, the coil of the wheel speed sensor 48 may transmit an electric signal (Alternating Current signal), corresponding to the change in magnetic field around the permanent magnet, to the brake control apparatus 100. The brake control apparatus 100 may detect the rotational speed of the wheel 2 based on the electric signal of the wheel speed sensor 48.

A brake pedal 44 may acquire a driver's braking intention, and a brake pedal sensor 44a may measure a displacement of the brake pedal 44 by the driver's braking intention. For instance, a movement distance and speed of the brake pedal 44 may be measured by the brake pedal sensor 44a. The brake pedal sensor 44a may transmit a sensing signal, e.g. current or voltage, indicating the displacement or movement of the brake pedal 44, to the brake control apparatus 100.

The brake control apparatus 100 may include a hydraulic circuit and an electric controller. The hydraulic circuit supplies hydraulic pressure to a wheel cylinder in response to the driver's braking intention through the brake pedal 44. The electric controller controls the hydraulic circuit.

The brake control apparatus 100 may control the hydraulic pressure supplied to the wheel cylinder of the brake apparatus 41 so that brake of the wheel is temporarily released in response to spin of the wheel 2 when braking the vehicle 1 (Anti-lock Braking Systems, ABS).

The brake control apparatus 100 may control the hydraulic pressure, supplied to the wheel cylinder of the brake apparatus 41, in order to selectively brake the wheel 2 in response to oversteering and/or understeering when steering the vehicle 1 (Electronic stability control, ESC).

Also, the brake control apparatus 100 may control rotation of the wheel 2 in response to spin of the wheel 2 when driving the vehicle 1. For instance, the brake control apparatus 100 may control the hydraulic pressure, supplied to the wheel cylinder of the brake apparatus 41, in order to temporarily brake the wheel 2 in response to spin of the wheel 2 when starting the vehicle 1. Also, the brake control apparatus 100 may control the engine control module 12 to reduce a torque of the engine 11 in response to spin of the wheel 2 while driving the vehicle 1. Further, in response to spin of the wheel 2 while driving the vehicle 1, the brake control apparatus 100 may control the hydraulic pressure, supplied to the wheel cylinder of the brake apparatus 41, in order to temporarily brake the wheel 2.

The drive system 10 and the brake system 40 may communicate with each other via an in-vehicle network. For example, electric components may transmit and/or receive data via Ethernet, Media Oriented Systems Transport (MOST), Flexray, Controller Area Network (CAN), Local Interconnect Network (LIN), and the like. That is, the engine control module 12 may transmit data, e.g. the number of rotations of the engine 11 and/or a driving torque, a displacement of an accelerator pedal 11a, via the network.

The brake control apparatus 100 may receive the data including the number of rotations of the engine 11, the driving torque of the engine 11, the displacement of the accelerator pedal 11a, a gear position of the transmission 21, etc., and may control the brake apparatus 41 based on the received data.

FIG. 2 is a hydraulic circuit diagram of a brake control apparatus according to an embodiment.

Referring to FIG. 2, the vehicle 1 includes the brake pedal 44 receiving driver's braking intention. The brake control apparatus 100 includes a reservoir 103, a master cylinder 104, a piston pump 160, a drive motor 150, and a hydraulic circuit 110. Here, the reservoir 103 stores pressurization medium, e.g. brake oil. The master cylinder 104 generates hydraulic pressure by movement of the brake pedal 44. The piston pump 160 generates hydraulic pressure in response to sensing the movement of the brake pedal 44. The drive motor 150 drives the piston pump 160. The hydraulic circuit 110 connects the master cylinder 104 and/or the piston pump 160 to the first and second wheel cylinders 47a and 47b.

The piston pump 160 includes a cylinder 161 and a piston 162, and an inside of the cylinder 161 may be divided into a first pressure chamber 161a and a second pressure chamber 161b by the piston 162.

The piston pump 160 may generate hydraulic pressure by movement of the piston 162 according to the movement of the brake pedal 44. The brake pedal sensor 44a may be provided to sense the movement of the brake pedal 44, and the piston 162 of the piston pump 160 may move based on output of the brake pedal sensor 44a.

The drive motor 150 may generate rotational force for moving the piston 162. The rotational force of the drive motor 150 may be converted into reciprocating power through a power transmission part, e.g. a plurality of gears, and the piston 162 may reciprocate by the reciprocating power converted in the power transmission part.

The hydraulic circuit 110 may hydraulically connect the piston pump 160 to the first and second wheel cylinders 47a and 47b. Also, the hydraulic circuit 110 may transmit or block the hydraulic pressure, generated from the piston pump 160, to or from the first and second wheel cylinders 47a and 47b.

The hydraulic circuit 110 includes a main flow path 111 connecting the piston pump 160 to the first and second wheel cylinders 47a and 47b. Also, a hydraulic pressure controller 117, first and second inlet valves 113a and 113b, and first and second outlet valves 114a and 114b are located on the main flow path 111.

The hydraulic pressure controller 117 may include a plurality of valves and be hydraulically connected to the first pressure chamber 161a and the second pressure chamber 161b of the piston pump 160. The hydraulic pressure controller 117 may guide the hydraulic pressure, generated by the piston pump 160, to the first and second wheel cylinders 47a and 47b. For instance, the hydraulic pressure controller 117 may guide hydraulic pressure, generated in the first pressure chamber 161a while the piston 162 is moving forward, to the first and second wheel cylinders 47a and 47b. Also, the hydraulic pressure controller 117 may guide hydraulic pressure, generated in the second pressure chamber 161b while the piston 162 is moving backward, to the first and second wheel cylinders 47a and 47b.

In a downstream of the hydraulic pressure controller 117, the main flow path 111 branches into a first main flow path 111a and a second main flow path 111b. The first main flow path 111a extends to the first wheel cylinder 47a connected to the first wheel 2a, and the second main flow path 111b extends to the second wheel cylinder 47b connected to a second wheel 2b. Here, the first wheel 2a and the second wheel 2b may be left and right wheels, respectively. For example, the first wheel 2a may be a left front wheel or left rear wheel, and the second wheel 2b may be a right front wheel or right rear wheel.

The first and second inlet valves 113a and 113b and the first and second outlet valves 114a and 114b may be provided on each of the first main flow path 111a and the second main flow path 111b.

The first and second inlet valves 113a and 113b may be located on the first and second main flow paths 111a, 111b connecting the piston pump 160 to the first and second wheel cylinders 47a and 47b. Specifically, the first inlet valve 113a may be located on the first main flow path 111a, and the second inlet valve 113b may be located on the second main flow path 111b. The first and second inlet valves 113a and 113b may allow or block hydraulic pressure transmitted from the piston pump 160 to the first and second wheel cylinders 47a and 47b. The first and second inlet valves 113a and 113b may be a normally open solenoid valve.

The first and second outlet valves 114a and 114b may be located on flow paths connecting the first and second wheel cylinders 47a and 47b to the reservoir 103. The first outlet valve 114a may be located on the flow path connecting the first wheel cylinder 47a to the reservoir 103, and the second outlet valve 114b may be located on the flow path connecting the second wheel cylinder 47b to the reservoir 103. The first and second outlet valves 114a and 114b may allow hydraulic pressure of the first and second wheel cylinders 47a and 47b to be discharged to the reservoir 103 or block hydraulic pressure of the first and second wheel cylinders 47a and 47b from being discharged to the reservoir 103. The first and second outlet valves 114a and 114b may be a normally closed solenoid valve.

The hydraulic circuit 110 may further include an auxiliary flow path 112 connecting the master cylinder 104 to the first wheel cylinder 47a, and a cut valve 118 provided on the auxiliary flow path 112.

The cut valve 118 may prevent hydraulic pressure of the master cylinder 104 from being supplied to the first wheel cylinder 47a. That is, the cut valve 118 may block the hydraulic pressure of the master cylinder 104 and allow hydraulic pressure of the piston pump 160 to be supplied to the first wheel cylinder 47a.

When the piston pump 160 is broken or out of control, the cut valve 118 may be open, and thus the hydraulic pressure of the master cylinder 104 may be supplied to the wheel cylinder due to the open of the cut valve 118. The cut valve 118 may be a normally open solenoid valve to allow the piston pump 160 and the first and second wheel cylinders 47a and 47b to be connected, when power is out.

The hydraulic circuit 110 may further include check valves appropriately located on the flow path to prevent reverse flow of brake oil. Also, the valves included in the brake control apparatus 100, i.e. the first and second inlet valves 113a and 113b, the first and second outlet valves 114a and 114b, the hydraulic pressure controller 117, the cut valve 118, the check valves, and the like, may integrally form a valve block.

The brake control apparatus 100 may further include a pressure sensor 140 measuring hydraulic pressure of the hydraulic circuit 110.

When a driver operates the brake pedal 44, the piston pump 160 may supply hydraulic pressure to the first and second wheel cylinders 47a and 47b through the hydraulic pressure controller 117 and the first and second inlet valves 113a and 113b.

Also, the brake control apparatus 100 may generate and control hydraulic pressure for realizing aforementioned ABS, ESC and/or Brake Traction Control System (BTCS).

Figure 3:
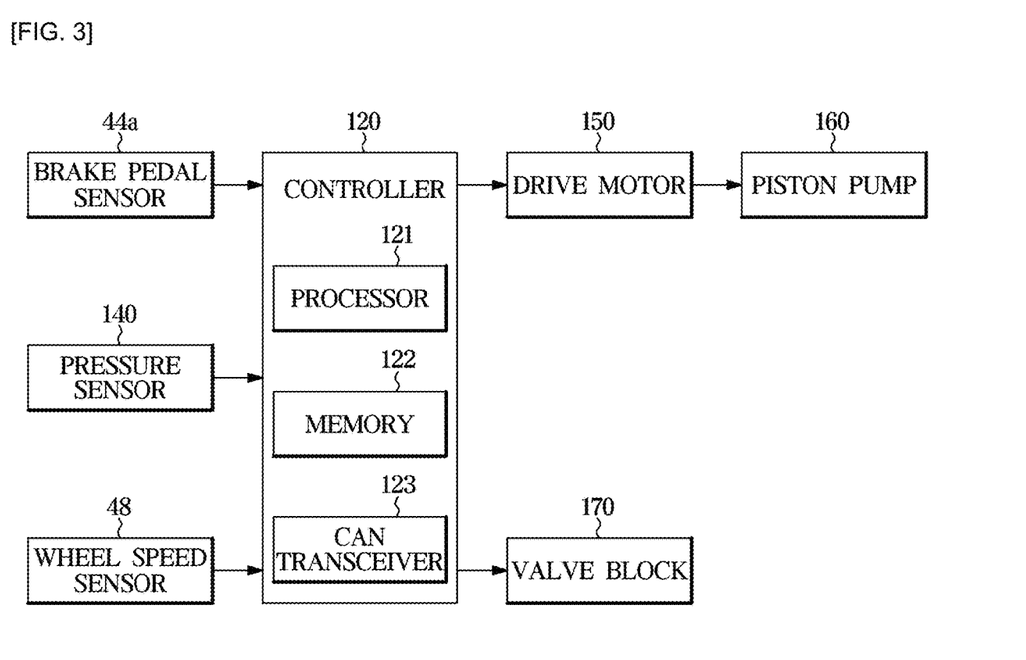
FIG. 3 is a block diagram illustrating a control block of a brake control apparatus according to an embodiment.
Figure 5:
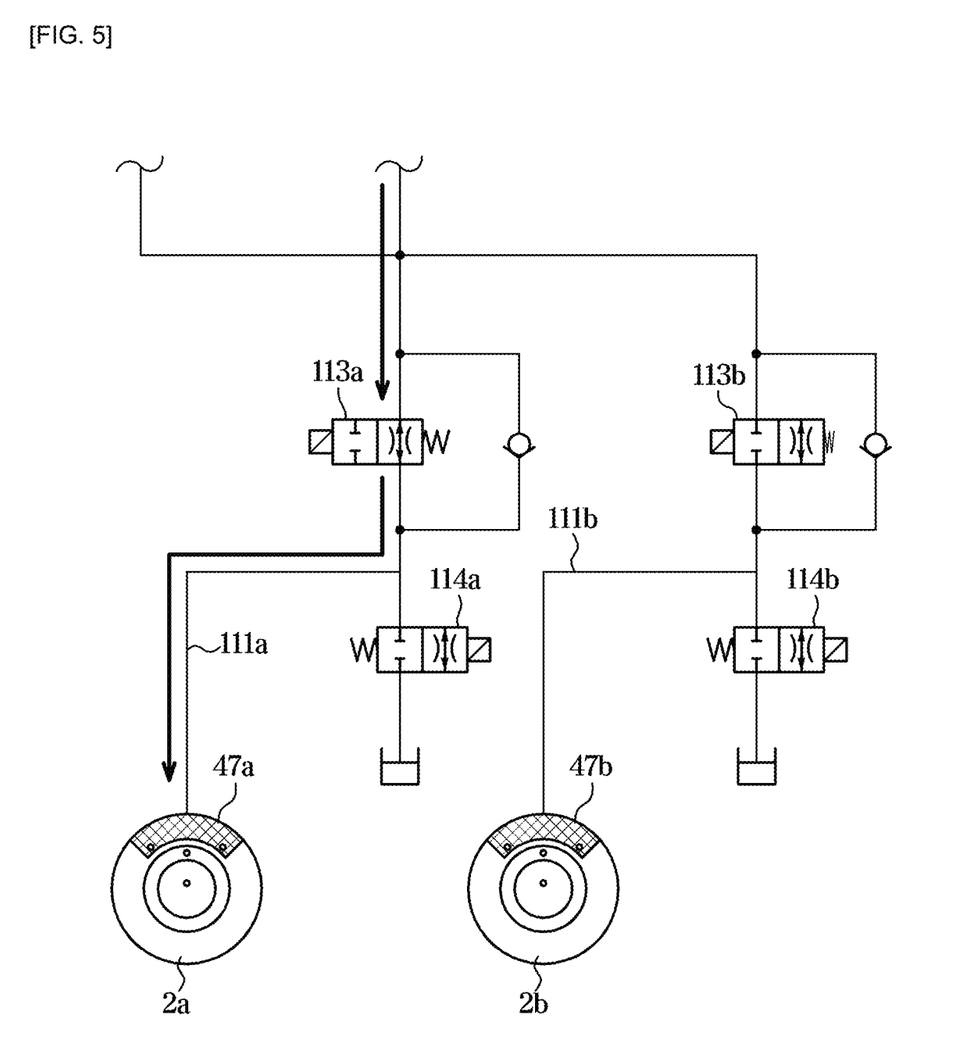
FIG. 5 is a diagram illustrating a hydraulic supply by a Brake Traction Control System (BTCS) in a brake control apparatus according to an embodiment.
Figure 6:
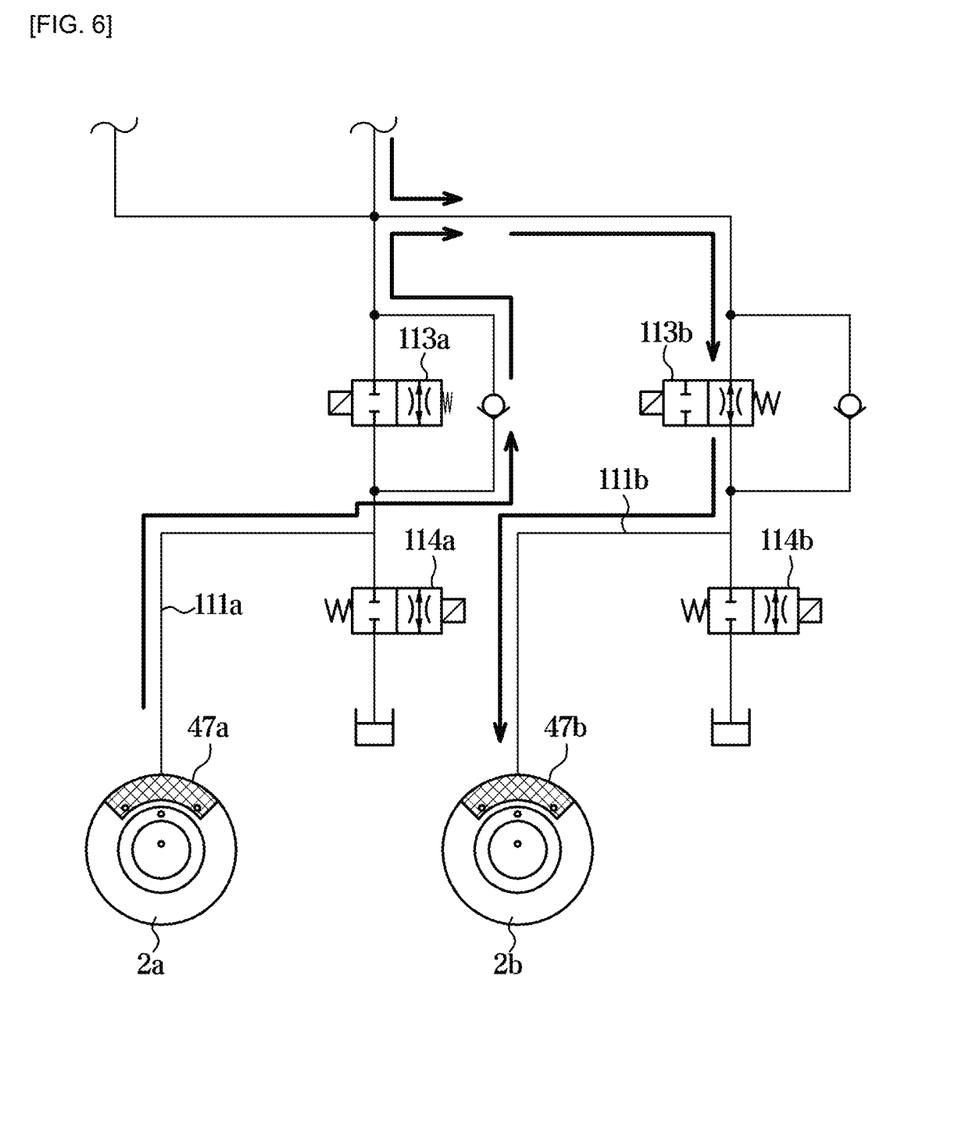
FIG. 6 is a diagram illustrating a hydraulic supply by a driver's braking intention in a brake control apparatus according to an embodiment.

FIG. 3 is a block diagram illustrating a control block of a brake control apparatus according to an embodiment. FIG. 5 is a diagram illustrating a hydraulic supply by the BTCS in a brake control apparatus according to an embodiment. FIG. 6 is a diagram illustrating a hydraulic supply by a driver's braking intention in a brake control apparatus according to an embodiment.

As shown in FIG. 3, the vehicle 1 includes the brake pedal sensor 44a and the wheel speed sensor 48. The brake pedal sensor 44a senses movement of the brake pedal 44, and the wheel speed sensor 48 senses rotational speed of the wheel 2. The brake control apparatus 100 includes the pressure sensor 140, the piston pump 160, the drive motor 150, a valve block 170 and a controller 120. Here, the pressure sensor 140 senses hydraulic pressure in the hydraulic circuit 110. The piston pump 160 generates hydraulic pressure to be supplied to the wheel cylinders 47a and 47b. The drive motor 150 drives the piston pump 160. The valve block 170 opens or closes a flow path guiding the hydraulic pressure, generated by the piston pump 160, to the wheel cylinders 47a and 47b. The controller 120 controls an operation of the brake control apparatus 100.

In this instance, the brake pedal sensor 44a and the wheel speed sensor 48 may be the brake pedal sensor and the wheel speed sensor described above referring to FIG. 1.

The pressure sensor 140 may be provided on the hydraulic circuit 110 that supplies hydraulic pressure to the wheel cylinders 47a and 47b, and sense hydraulic pressure of the pressurization medium on the hydraulic circuit 110. Also, the pressure sensor 140 may provide an electronic output signal (pressure signal) based on the sensed hydraulic pressure to the controller 120. The controller 120 may determine the hydraulic pressure, generated by the master cylinder 104 and/or the piston pump 160, based on the pressure signal of the pressure sensor 140.

A position and the number of pressure sensor 140 are not limited. For instance, the pressure sensor 140 may be positioned anywhere as long as it can sense the hydraulic pressure generated by the master cylinder 104 and/or the piston pump 160. Also, a sufficient number of pressure sensors 140 may be provided to sense the hydraulic pressure generated by the master cylinder 104 and/or the piston pump 160.

The piston pump 160 may generate hydraulic pressure from rotational force of the drive motor 150. For example, the piston pump 160 including the cylinder 161 and the piston 162 may generate hydraulic pressure by movement of the piston 162 due to rotation of the drive motor 150.

The drive motor 150 may generate rotational force in response to a drive signal of the controller 120. The rotational force generated by the drive motor 150 may be supplied to the piston pump 160. For example, the drive motor 150 may include BrushLess Direct Current Motor (BLDC motor), Permanent Synchronous Motor (PMSM), Direct Current Motor (DC motor), induction motor, and the like.

The valve block 170 may include a plurality of valves included in the brake control apparatus 100. For instance, the first and second inlet valves 113a and 113b, the first and second outlet valves 114a and 114b, the hydraulic pressure controller 117 and the cut valve 118, shown in FIG. 2, may be included in the valve block 170.

Also, the valve block 170 may open or close a flow path included in the hydraulic circuit 110 in response to the control signal such as an open signal or close signal. For instance, as shown in FIG. 2, the valve block 170 may provide a flow path for guiding hydraulic pressure to the wheel cylinders 47a and 47b from the master cylinder 104, or a flow path guiding hydraulic pressure to the wheel cylinders 47a and 47b from the piston pump 160.

The controller 120 may include a plurality of semiconductor devices and be variously referred to as Electronic Control Unit (ECU), and the like.

Also, the controller 120 may control the drive motor 150 and the valve block 170 based on an output signal (a pedal signal) of the brake pedal sensor 44a, an output signal (a pressure signal) of the pressure sensor 140, an output signal (a wheel speed signal) of the wheel speed sensor 48. In addition, the controller 120 may acquire data related to driving of the vehicle 1 from the engine control module 12 via in-vehicle network, and thus may control the drive motor 150 and the valve block 170 based on the acquired data.

The controller 120 includes a Controller Area Network (CAN) transceiver 123, a memory 122, and a processor 121. The CAN transceiver 123, the memory 122, and the processor 121 may be implemented as separate semiconductor devices or a single semiconductor device. Also, the controller 120 may include a plurality of processors and/or a plurality of memories.

The CAN transceiver 123 may receive the data related to driving of the vehicle 1 from the engine control module 12 via in-vehicle network. For instance, the CAN transceiver 123 may receive data including a displacement of the accelerator pedal 11a, driving torque of the engine 11, etc., from the engine control module 12. Also, the CAN transceiver 123 may transmit the received data to the processor 121.

The memory 122 may memorize/store a program and data for braking the vehicle 1 based on a driver's braking intention. For example, the memory 122 may memorize/store a program and data that controls the drive motor 150 and the valve block 170 based on an output of the brake pedal sensor 44a.

The memory 122 may include a volatile memory such as Static Random Access Memory (S-RAM) and Dynamic Random Access Memory (D-RAM), and a non-volatile memory such as Read Only Memory (ROM), Erasable Programmable Read Only Memory (EPROM), flash memory, and the like. The memory 122 may include a single semiconductor device or a plurality of semiconductor devices.

The processor 121 may output a control signal for braking the vehicle 1 based on the driver's braking intention. For instance, the processor 121 may output the control signal for controlling the drive motor 150 and the valve block 170 based on the output of the brake pedal sensor 44a according to the program and data of the memory 121.

The processor 121 may include a single semiconductor device or a plurality of semiconductor devices. Also, a single core or a plurality of cores may be included in a single semiconductor device in the processor 121. The processor 121 may be variously referred to as Micro Processing Unit (MPU), and the like.

As described above, the controller 120 may control the drive motor 150 and/or the valve block 170 to brake the vehicle 1 based on a brake signal outputted from the brake pedal sensor 44a. That is, the controller 120 may control the valve block 170 to open the first and second inlet valves 113a and 113b, and control the drive motor 150 to move the piston 162 based on the displacement of the brake pedal 44.

Spin or slip of the wheel 2 may occur when the vehicle 1 is starting or driving on a road with a low friction coefficient. For instance, spin of wheels driven by a drive system may occur, and thus the vehicle 1 may not move forward and may slide due to the wheel spin. Also, spin or slip of the wheel 2 may occur when the vehicle 1 is starting or driving on a road with an uneven friction coefficient (Split mu). For example, spin may occur on either a left wheel or a right wheel. When the wheel spin occurs, a driving torque of the engine 11 may be provided only to the wheel where the spin occurs due to a differential gear. Accordingly, the vehicle 1 may not move forward and may slide.

The brake control apparatus 100 may control spin of the wheel 2 for improving traction on a road with a low friction coefficient or uneven friction coefficient. In this instance, the traction refers to the force that enables the vehicle 1 to move forward. The controller 120 may sense the spin of the wheel 2 based on a difference in rotational speed of the wheels, e.g. a difference in rotational speed between a driving wheel and a driven wheel. When a spin of the wheel 2 greater than or equal to a target spin is sensed, the controller 120 may control a driving torque and a braking torque so that the spin of the wheel 2 is less than the target spin. The controller 120 may provide the engine control module 12 with a message for reducing the driving torque of the engine 11. Also, the controller 120 may apply the braking torque to the wheel whose spin is greater than or equal to the target spin in order to reduce a rotational speed of the wheel. In particular, when a spin is sensed in any one of the left wheel and the right wheel, the controller 120 may apply the braking torque to the wheel whose spin is greater than or equal to the target spin, in order to balance the driving torque of the left wheel and the right wheel. For instance, the controller 120 may control the valve block 170 to open only the inlet valve corresponding to the wheel whose spin is greater than or equal to the target spin. Also, the controller 120 may control the drive motor 150 so that the piston 162 move based on the wheel spin.

Further, when braking by the BTCS and braking by a driver's braking intention are simultaneously performed, the controller 120 may control the valve block 170 to close an inlet valve of the wheel requiring braking by the BTCS, and to open an inlet valve of the wheel requiring braking by the driver's braking intention. In this instance, the controller 120 may control the drive motor 150 to stepwise or linearly increase pressure in the wheel cylinder until a braking torque by the driver's braking intention is reached. Accordingly, opening and closing of the outlet valves by the BTCS may be prevented, and driving instability of the vehicle 1 due to the wheel spin may be eliminated.

As described above, when a spin of the wheel 2 greater than or equal to the target spin is sensed, the controller 120 may control the brake control apparatus 100 to apply a braking torque to the wheel whose spin is greater than or equal to the target spin according to the BTCS.

When the driver operates the brake pedal 44 while a braking torque is applied to the wheel 2 according to the BTCS, braking by the BTCS and braking by the driver's braking intention may be simultaneously performed.

In this instance, the controller 120 may determine the braking torque by the driver's braking intention. When the braking torque by the driver's braking intention is less than the braking torque by BTCS, the controller 120 may supply hydraulic pressure by the BTCS to the wheel cylinder 47a of the first wheel 2a whose spin is sensed, and supply hydraulic pressure by the driver's braking intention to the wheel cylinder 47b of the second wheel 2b.

When the braking torque by the driver's braking intention is greater than or equal to the braking torque by BTCS, the controller 120 may control the brake control apparatus 100 to supply hydraulic pressure by the driver's braking intention to the wheel cylinders 47a and 47b. Accordingly, the braking torque that the driver wants may be generated and driving instability of the vehicle 1 due to the wheel spin may be eliminated.

In this instance, in a state where hydraulic pressure is already formed in the hydraulic circuit 110 to generate the braking torque by BTCS, when the drive motor 150 is rapidly operated to generate the braking torque by the driver's braking intention, vibration and/or noise may occur in the whole hydraulic circuit 110. To prevent this, the brake control apparatus 100 may supply hydraulic pressure to the wheel cylinders of the other wheels using the hydraulic pressure already formed in the hydraulic circuit 110.

Also, the controller 120 may use the hydraulic pressure formed in the hydraulic circuit 110 for the BTCS in order to provide the wheel cylinder with the braking torque by the driver's braking intention. For instance, the controller 120 may close the first inlet valve 113a of the first wheel 2a which is controlled by the BTCS and control a degree of opening of the second inlet valve 113b of the second wheel 2b in order to slowly supply the hydraulic pressure formed in the hydraulic circuit 110 to the wheel cylinder 47b of the second wheel 2b. Here, the degree of opening refers to a difference in pressures to keep the opening of the valve.

In this instance, when the braking torque by the driver's braking intention is less than the braking torque by the BTCS, the controller 120 may close the first inlet valve 113a of the first wheel 2a which is controlled by the BTCS and control magnitude (or duty ratio) of current supplied to the inlet valve in order to stepwise or linearly supply the hydraulic pressure, formed in the hydraulic circuit 110, to the wheel cylinder 47b of the second wheel 2b, for supplying the hydraulic pressure by the driver's braking intention. Accordingly, the hydraulic pressure in the hydraulic circuit 110 may be stepwise or linearly decreased by the stepwise or linear opening of the second inlet valve 113b. Also, due to the stepwise or linear decrease of hydraulic pressure in the hydraulic circuit 110, the hydraulic pressure in the first wheel cylinder 47a may be discharged to the hydraulic circuit 110 by a check valve, although the first inlet valve 113a is closed. Here, the check valve is located parallel to the first inlet valve 113a.

In addition, when the braking torque by the driver's braking intention is greater than or equal to the braking torque by the BTCS, the controller 120 may open all the first and second inlet valves 113a and 113b and operate the drive motor 150 in order to supply the hydraulic pressure by the driver's braking intention to all the wheel cylinders 47a and 47b after equilibrium is achieved between the hydraulic pressure in the hydraulic circuit 110 and the hydraulic pressure in the wheel cylinders 47a and 47b.

As described above, when braking by the BTCS and braking by the driver's braking intention are simultaneously performed, the brake control apparatus 100 may control the degree of opening of the inlet valve of the wheel cylinder, i.e., a difference in pressure to keep the opening of the valve. Accordingly, the brake control apparatus 100 may perform both braking by the BTCS and braking by the driver's braking intention without sudden pressure fluctuation in the hydraulic circuit 110.

FIGS. 4A, 4B, 4C and 4D are a graph illustrating an operation of valve and pressure in hydraulic circuit of a brake control apparatus according to an embodiment. FIG. 5 is a diagram illustrating a hydraulic supply by the BTCS in a brake control apparatus according to an embodiment. FIG. 6 is a diagram illustrating a hydraulic supply by a driver's braking intention in a brake control apparatus according to an embodiment.

When a spin of a wheel greater than or equal to a target spin is sensed, the brake control apparatus 100 may supply a braking torque to the wheel. Specifically, the controller 120 may activate the BTCS based on a spin of any one of the first and second wheels 2a and 2b.

The controller 120 may identify which one of the first and second wheels 2a and 2b is spinning, based on a difference in rotational speed of the first and second wheels 2a and 2b, e.g. a difference in rotational speed of a driving wheel and a driven wheel.

Figure 4A:
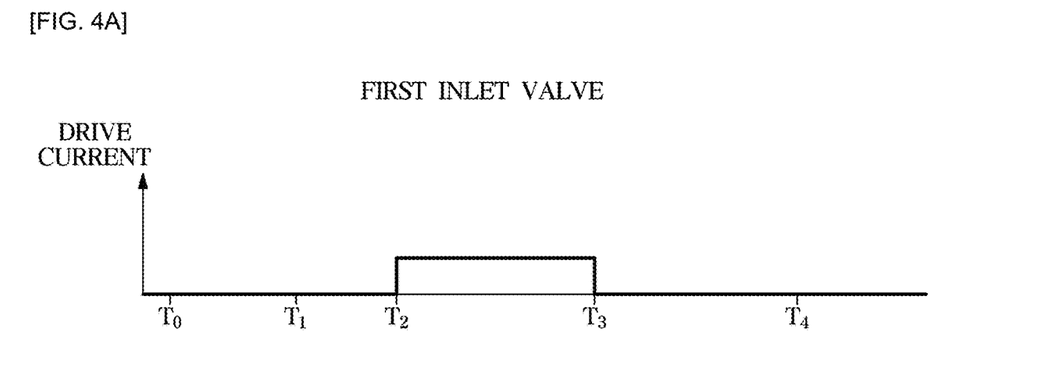
FIGS. 4A, 4B, 4C and 4D illustrate an operation of valve and pressure in hydraulic circuit of a brake control apparatus according to an embodiment.
Figure 4B:
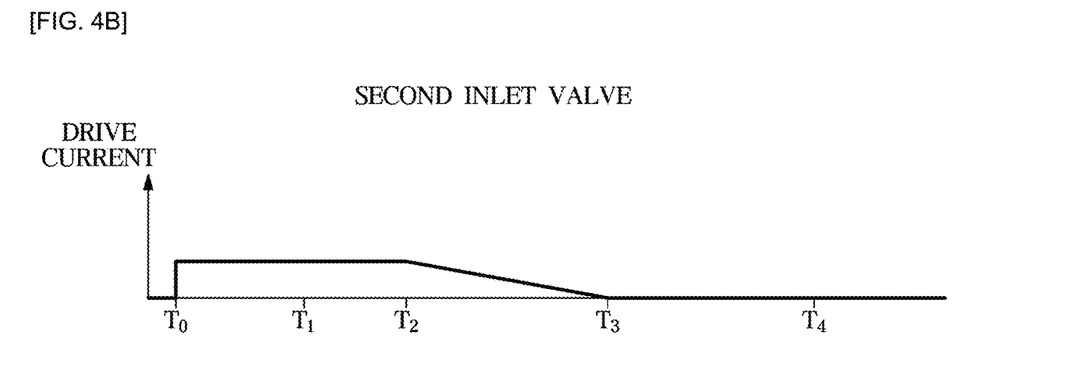
Figure 4C:
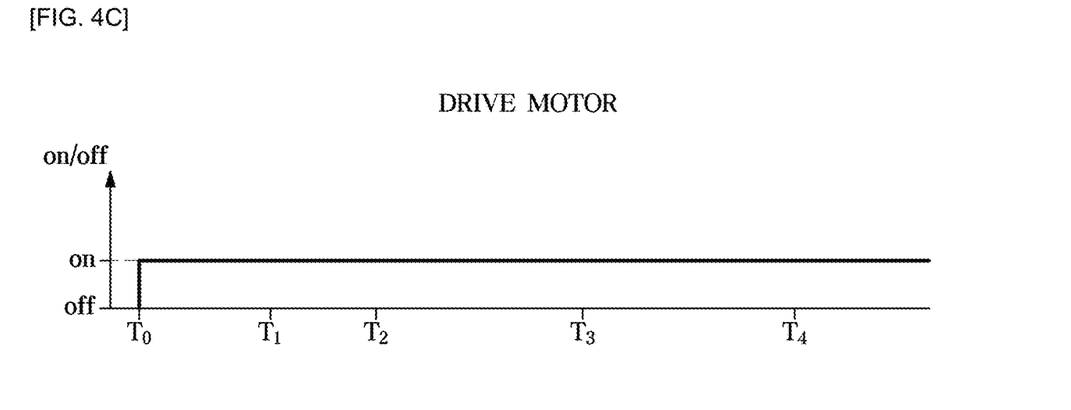

The controller 120 may control the brake control apparatus 100 to apply a braking torque to the wheel whose spin is identified, in response to the identifying described above. For example, the controller 120 may control the brake control apparatus 100 to apply a braking torque to the first wheel 2a whose spin greater than or equal to the target spin is sensed. As shown in FIGS. 4A, 4B, and 4C, the controller 120 may control the valve block 170 to close the second inlet valve 113b with the first inlet valve 113a open at $T_0$, and operate the drive motor 150. Here, the first inlet valve 113a and the second inlet valve 113b correspond to the first wheel 2a and the second wheel 2b, respectively, and T refers to a point in time. Specifically, the controller 120 may supply minimum drive current, e.g. drive current of "0", to the first inlet valve 113a to enable the first inlet valve 113a to be open, and supply maximum drive current to the second inlet valve 113b to enable the second inlet valve 113b to be closed.

Figure 4D:
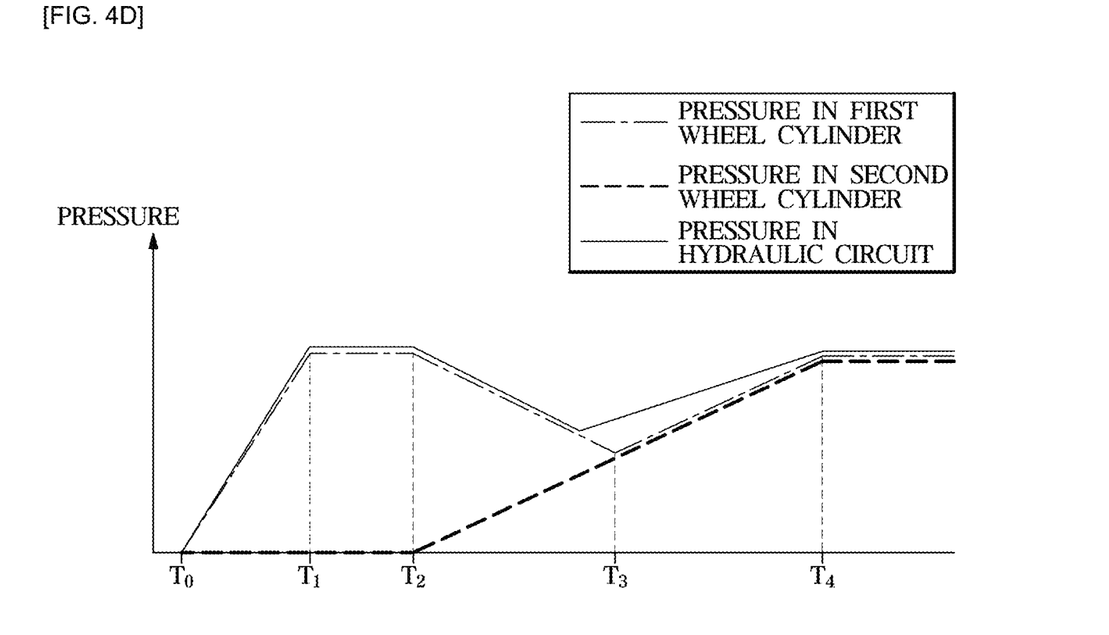

Accordingly, as shown in FIG. 5, pressure in the hydraulic circuit 110 may be selectively supplied to the first wheel cylinder 47a. Also, as shown in FIG. 4D, the pressure in the first wheel cylinder 47a and the pressure in the hydraulic circuit 110 may be simultaneously increased, and thus the braking torque by the BTCS may be provided to the first wheel 2a. In this instance, the pressure in the second wheel cylinder 47b may be maintained at approximately atmospheric pressure.

Afterwards, when pressure in the first wheel cylinder 47a of the first wheel 2a whose spin greater than or equal to the target spin is sensed reaches a target pressure, the brake control apparatus 100 may keep operating the drive motor 150 in order for the pressure in the first wheel cylinder 47a to be maintained at the target pressure. Accordingly, as shown in FIG. 4D, hydraulic pressure for BTCS may be maintained in the first wheel cylinder 47a.

While the BTCS is operated, the controller 120 may identify a driver's braking intention based on a displacement of the brake pedal 44 sensed by the brake pedal sensor 44a. In response to the driver's braking intention, the controller 120 may control the brake control apparatus 100 to supply a braking torque to all the wheels 2a and 2b or the second wheel 2b which is not controlled by the BTCS.

For instance, the controller 120 may compare the braking torque by the driver's braking intention to the braking torque by the BTCS, and when the braking torque by the driver's braking intention is greater than or equal to the braking torque by the BTCS, may apply the braking torque by the driver's braking intention to all the wheels 2a and 2b.

As shown in FIGS. 4A, 4B and 4C, the controller 120 may close the first inlet valve 113a of the first wheel cylinder 47a at $T_2$. Here, $T_2$ refers to the point in time when the driver's braking intention is sensed. Also, the controller 120 may control magnitude (or duty ratio) of current supplied to the second inlet valve 113b, in order to stepwise or linearly open the second inlet valve 113b of the second wheel cylinder 47b after closing the first inlet valve 113a. Specifically, the controller 120 may supply maximum drive current to the first inlet valve 113a so that the first inlet valve 113a is closed. Also, the controller 120 may reduce the magnitude (or duty ratio) of current supplied to the second inlet valve 113b for reducing the force that closes the second inlet valve 113b.

As shown in FIG. 4D, hydraulic pressure in the hydraulic circuit 110 may be stepwise or linearly decreased by the stepwise or linear opening of the second inlet valve 113b. The stepwise or linear decrease in the hydraulic pressure of the hydraulic circuit 110 may lead to decrease in hydraulic pressure of the first wheel cylinder 47a. As shown in FIG. 6, although the first inlet valve 113a is closed, the hydraulic pressure in the first wheel cylinder 47a may be discharged to the hydraulic circuit 110 due to the check valve located parallel to the first inlet valve 113a. Accordingly, as shown in FIG. 4D, the hydraulic pressure in the first wheel cylinder 47a may be stepwise or linearly decreased. Also, the hydraulic pressure in the hydraulic circuit 110 may be supplied to the second wheel cylinder 47b through the second inlet valve 113b, and thus, as shown in FIG. 4D, the hydraulic pressure in the second wheel cylinder 47b may be stepwise or linearly increased.

Although it has been described above that the first inlet valve 113a is closed while the second inlet valve 113b is stepwise or linearly opening, the example embodiments are not limited thereto. For example, while the second inlet valve 113b is stepwise or linearly opening, the first inlet valve 113a may remain open. In this instance, the first outlet valve 114a remains closed, and the hydraulic pressure in the first wheel cylinder 47a may be practically the same as that of the hydraulic circuit 110 due to the opening of the first inlet valve 113a.

Afterwards, when equilibrium is achieved between the hydraulic pressure in the hydraulic circuit 110 and the hydraulic pressure in the first and second wheel cylinders 47a and 47b, the controller 120 may supply the hydraulic pressure by the driver's braking intention to all the wheel cylinders 47a and 47b. For example, as shown in FIGS. 4A, 4B, and 4C, the controller 120 may open the first inlet valve 113a and keep operating the drive motor 150 at $T_3$. Here, $T_3$ refers to the point in time when the second inlet valve 113b, which stepwise or linearly opens, is completely open. Specifically, when drive current of the second inlet valve 113b becomes minimum drive current, e.g. drive current of "0", the controller 120 may supply minimum drive current, e.g. drive current of "0", to the first inlet valve 113a to open the first inlet valve 113a. Accordingly, as shown in FIG. 4D, the hydraulic pressure in the hydraulic circuit 110 and the first and second wheel cylinders 47a and 47b may be increased after $T_3$.

Afterwards, the controller 120 may keep operating the drive motor 150 at $T_4$ for maintaining the hydraulic pressure. Here, $T_4$ refers to the point in time when the hydraulic pressure in the first and second wheel cylinders 47a and 47b reaches the hydraulic pressure by the driver's braking intention. Accordingly, as shown in FIG. 4D, the hydraulic pressure in the hydraulic circuit 110 and the first and second wheel cylinders 47a and 47b may be maintained at the target hydraulic pressure after $T_4$.

As another example, when the braking torque by the driver's braking intention is less than the braking torque by BTCS, the controller 120 may open the first inlet valve 113a in order to maintain the hydraulic pressure by the BTCS in the first wheel cylinder 47a and the hydraulic circuit 110, and may control a degree of opening of the second inlet valve 113b in order to maintain the hydraulic pressure by the driver's braking intention in the second wheel cylinder 47b. Here, the degree of opening refers to a difference in pressure to keep the opening of the valve.

As described above, when braking by the BTCS and braking by the driver's braking intention are simultaneously performed, the brake control apparatus 100 may control the degree of opening of the inlet valve of the wheel cylinder, i.e. a difference in pressure to keep the opening of the valve. Accordingly, the brake control apparatus 100 may perform both braking by the BTCS and braking by the driver's braking intention without sudden pressure fluctuation in the hydraulic circuit 110.

Figure 7:
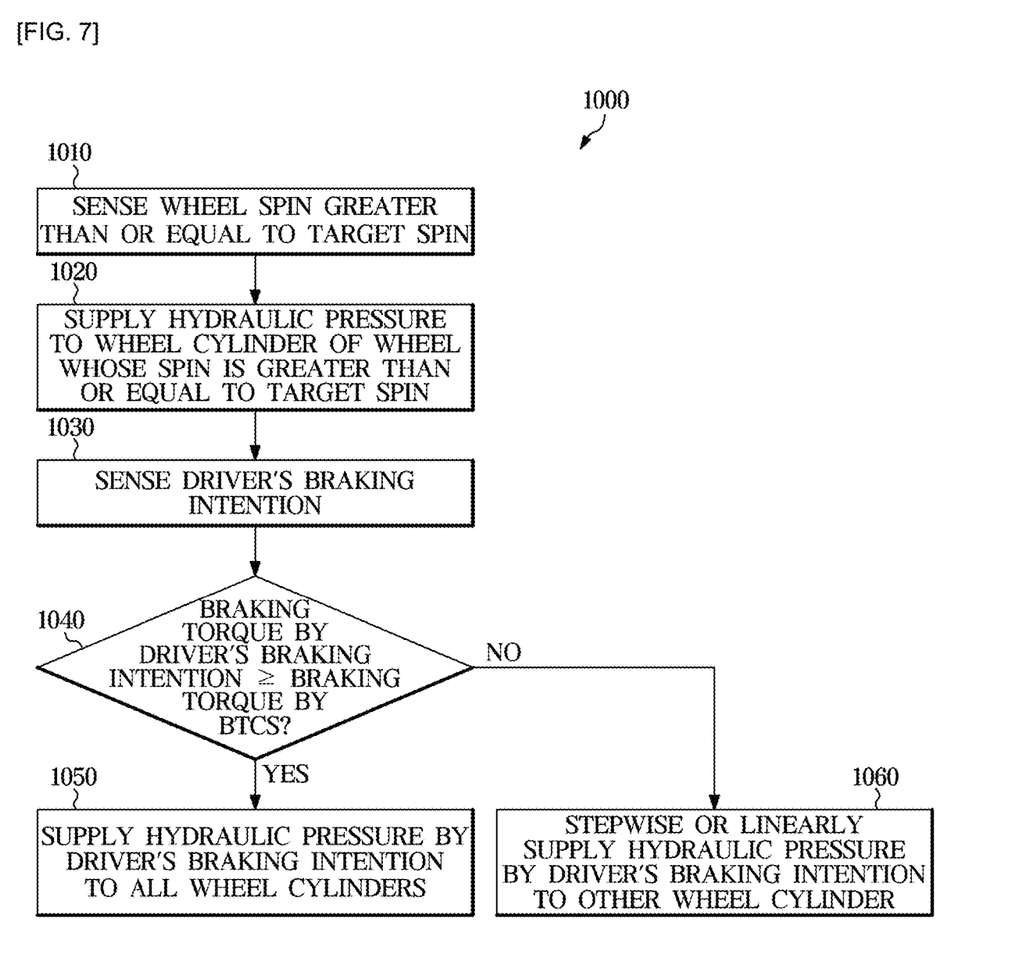
FIG. 7 is a flowchart illustrating a method of controlling a brake apparatus according to an embodiment.

FIG. 7 is a flowchart illustrating a method of controlling a brake apparatus according to an embodiment.

Referring to FIG. 7, operations 1000 of the brake control apparatus 100 mounted in the vehicle 1 is described.

The brake control apparatus 100 senses a wheel spin greater than or equal to a target spin (1010).

For example, the controller 120 may determine whether a spin of the first wheel 2a is greater than or equal to the target spin based on a wheel speed signal of the wheel speed sensor 48.

The brake control apparatus 100 supplies hydraulic pressure to a wheel cylinder of the wheel whose spin is greater than or equal to the target spin (1020).

For instance, the controller 120 may open the first inlet valve 113a of the first wheel cylinder 47a mounted close to the first wheel 2a, and close the second inlet valve 113b of the second wheel cylinder 47b mounted close to the second wheel 2b. Afterwards, the controller 120 may control the drive motor 150 of the piston pump 160 so that the hydraulic pressure based on the sensed wheel spin is supplied to the first wheel cylinder 47a. Here, the piston pump 160 generates hydraulic pressure.

The brake control apparatus 100 senses a driver's braking intention (1030).

For instance, the controller 120 may sense the driver's braking intention based on a brake signal of the brake pedal sensor 44a. Here, the brake signal indicates a displacement of the brake pedal 44.

The brake control apparatus 100 determines whether a braking torque by the driver's braking intention is greater than or equal to a braking torque by the BTCS (1040).

For example, the controller 120 may calculate the braking torque corresponding to the displacement of the brake pedal 44, and calculate the braking torque corresponding to the wheel spin of the first wheel 2a. The controller 120 may determine whether the braking torque corresponding to the displacement of the brake pedal 44 is greater than or equal to the braking torque corresponding to the wheel spin of the first wheel 2a.

The brake control apparatus 100 supplies hydraulic pressure by the driver's braking intention to all the wheel cylinders 47a and 47b (1050).

For example, the controller 120 may open the first inlet valve 113a of the first wheel cylinder 47a, when the second inlet valve 113b of the second wheel cylinder 47b is completely open, and control the drive motor 150 to supply the hydraulic pressure by the driver's braking intention to all the wheel cylinders 47a and 47b when all the inlet valves 113a and 113b are open.

That is, when the braking torque by the driver's braking intention is greater than or equal to the braking torque by the BTCS, the brake control apparatus 100 may supply the hydraulic pressure by the driver's braking intention to all the wheel cylinders 47a and 47b, and thus the braking torque corresponding to the driver's braking intention may be applied to all the wheels 2a and 2b.

When the braking torque by the driver's braking intention is less than the braking torque by the BTCS (No in operation 1040), the brake control apparatus 100 stepwise or linearly supplies the hydraulic pressure by the driver's braking intention to the other wheel cylinder (1060).

The brake control apparatus 100 may stepwise or linearly supply the hydraulic pressure of the other wheel cylinder in a state that the wheel cylinder of the wheel whose spin is greater than or equal to the target spin remains connected to the hydraulic circuit 110.

For example, the controller 120 may stepwise or linearly open the second inlet valve 113b to supply the hydraulic pressure corresponding to the driver's braking intention to the second wheel cylinder 47b in a state that the first inlet valve 113a of the first wheel cylinder 47a remains open. Also, the controller 120 may control the drive motor 150 to maintain the hydraulic pressure of the first wheel cylinder 47a at a target hydraulic pressure corresponding to the wheel spin, based on the hydraulic pressure of the hydraulic circuit 110 sensed by a pressure sensor 140.

Accordingly, the hydraulic pressure of the first wheel cylinder 47a may be maintained at the target hydraulic pressure corresponding to the wheel spin, and the hydraulic pressure corresponding to the driver's braking intention may be supplied to the second wheel cylinder 47b. Also, the braking torque by the BTCS may be applied to the first wheel 2a whose spin is greater than or equal to the target spin, and the braking torque by the driver's braking intention may be applied to the second wheel 2b.

As is apparent from the above, the brake control apparatus and the method of controlling the brake apparatus can minimize noise and secure the spin stability of wheels, although braking by the BTCS and braking by a driver are simultaneously performed.

Although embodiments have been described for illustrative purposes, those skilled in the art will appreciate that various modifications, additions and substitutions are possible, without departing from the scope and spirit of the disclosure. Therefore, embodiments have not been described for limiting purposes.

Exemplary embodiments have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. A brake control apparatus mounted in a vehicle with a plurality of wheels, the brake control apparatus comprising:
    an actuator configured to apply a braking torque to the plurality of wheels; and
    a controller configured to:
        control the actuator to apply a first braking torque to a first wheel of the plurality of wheels, based on a spin of the first wheel being greater than or equal to a target spin, and
        control the actuator to apply a second braking torque to the plurality of wheels based on a displacement of a brake pedal of the vehicle while applying the first braking torque to the first wheel,
        wherein the controller is configured to control the actuator to stepwise or linearly increase a braking torque applied to a second wheel of the plurality of wheels up to the second braking torque,
    wherein the actuator comprises:
    a piston pump configured to supply hydraulic pressure to a plurality of wheel cylinders corresponding to each of the plurality of wheels,
    a drive motor configured to drive the piston pump,
    a flow path extended to the plurality of wheel cylinders from the piston pump, and a plurality of valves located on the flow path, and
    wherein the controller is configured to control the drive motor and the plurality of valves based on the displacement of the brake pedal,
    wherein the controller is configured to open a first valve located on the flow path extended to a first wheel cylinder corresponding to the first wheel and control the drive motor to supply the first wheel cylinder with a first hydraulic pressure corresponding to the first braking torque, to enable the first braking torque to be applied to the first wheel,
    wherein the controller is configured to stepwise or linearly open a second valve, located on the flow path extended to a second wheel cylinder corresponding to the second wheel, to enable the braking torque applied to the second wheel to be stepwise or linearly increased up to the second braking torque, and
    wherein the controller is configured to stepwise or linearly open the second valve until the second valve is fully open, in response to the second braking torque being greater than or equal to the first braking torque.

2. The brake control apparatus of claim 1, wherein the controller is configured to reduce a magnitude or duty ratio of drive current supplied to the second valve, to enable the second valve to be stepwise or linearly open.

3. The brake control apparatus of claim 1, wherein the controller is configured to control the drive motor to supply a second hydraulic pressure corresponding to the second braking torque to the first wheel cylinder and the second wheel cylinder, in response to the second valve being fully open.

4. The brake control apparatus of claim 1, wherein the controller is configured to control drive current, supplied to the second valve, to enable the second valve to be closed when a hydraulic pressure of the second wheel cylinder reaches a hydraulic pressure corresponding to the displacement of the brake pedal, in response to the second braking torque being less than the first braking torque.

5. A method of controlling a brake apparatus mounted in a vehicle with a plurality of wheels, the method comprising:
    applying, by an actuator, a first braking torque to a first wheel of the plurality of wheels, based on a spin of the first wheel being greater than or equal to a target spin; and
    applying, by the actuator, a second braking torque to the plurality of wheels based on a displacement of a brake pedal of the vehicle while applying the first braking torque to the first wheel,
    wherein the applying of the second braking torque comprises stepwise or linearly increasing a braking torque, applied to a second wheel of the plurality of wheels, up to the second braking torque,
    wherein the applying of the first braking torque comprises:
    opening a first valve located on a flow path extended to a first wheel cylinder corresponding to the first wheel; and
    supplying the first wheel cylinder with a first hydraulic pressure corresponding to the first braking torque,
    wherein the applying of the second braking torque comprises:
    stepwise or linearly opening a second valve located on the flow path extended to a second wheel cylinder corresponding to the second wheel, and
    wherein the applying of the second braking torque further comprises:

stepwise or linearly opening the second valve until the second valve is fully open, in response to the second braking torque being greater than or equal to the first braking torque.

6. The method of claim 5, wherein the applying of the second braking torque further comprises:
supplying a second hydraulic pressure corresponding to the second braking torque to the first wheel cylinder and the second wheel cylinder, in response to the second valve being fully open.

7. The method of claim 5, wherein the applying of the second braking torque further comprises:
closing the second valve when a hydraulic pressure of the second wheel cylinder reaches a hydraulic pressure corresponding to the displacement of the brake pedal, in response to the second braking torque being less than the first braking torque.

8. A brake control apparatus mounted in a vehicle with a plurality of wheels, comprising:
a piston pump configured to supply a hydraulic pressure to a plurality of wheel cylinders corresponding to each of the plurality of wheels;
a drive motor configured to drive the piston pump;
a flow path extended to the plurality of wheel cylinders from the piston pump;
a plurality of valves located on the flow path; and
a controller configured to control the drive motor and the plurality of valves based on a displacement of a brake pedal,
wherein the controller is configured to:
open a first valve, located on the flow path extended to a first wheel cylinder corresponding to a first wheel, and controls the drive motor to supply the first wheel cylinder with a first hydraulic pressure corresponding to a first braking torque, based on a spin of the first wheel of the plurality of wheels being greater than or equal to a target spin, and
stepwise or linearly open a second valve, located on the flow path extended to a second wheel cylinder corresponding to a second wheel of the plurality of wheels, based on the displacement of the brake pedal,
wherein the controller is configured to open a first valve located on the flow path extended to a first wheel cylinder corresponding to the first wheel and control the drive motor to supply the first wheel cylinder with a first hydraulic pressure corresponding to the first braking torque, to enable the first braking torque to be applied to the first wheel,
wherein the controller is configured to stepwise or linearly open a second valve, located on the flow path extended to a second wheel cylinder corresponding to the second wheel, to enable the braking torque applied to the second wheel to be stepwise or linearly increased up to the second braking torque, and
wherein the controller is configured to stepwise or linearly open the second valve until the second valve is fully open, in response to the second braking torque being greater than or equal to the first braking torque.

9. The brake control apparatus of claim 8, wherein the controller is configured to reduce a magnitude or duty ratio of drive current supplied to the second valve, to enable the second valve to be stepwise or linearly open.

10. The brake control apparatus of claim 8, wherein the controller is configured to control the drive motor to supply a second hydraulic pressure corresponding to the second braking torque to the first wheel cylinder and the second wheel cylinder, in response to the second valve being fully open.

* * * * *